United States Patent [19]

Bril et al.

[11] Patent Number: 5,032,981
[45] Date of Patent: Jul. 16, 1991

[54] METHOD FOR INCREASING EFFECTIVE ADDRESSABLE DATA PROCESSING SYSTEM MEMORY SPACE

[75] Inventors: Vlad Bril, Campbell; Paul W. T. Heller, San Jose; Keith H. Uhlin, Alamo, all of Calif.

[73] Assignee: Cirrus Logic, Inc., Milpitas, Calif.

[21] Appl. No.: 336,386

[22] Filed: Apr. 10, 1989

[51] Int. Cl.⁵ .................. G06F 12/00; G06F 12/08; G06F 12/10
[52] U.S. Cl. ..................... 364/200; 364/280; 364/255.5; 364/254.3
[58] Field of Search ... 364/200 MS File, 900 MS File

[56] References Cited

U.S. PATENT DOCUMENTS

| | | | |
|---|---|---|---|
| 4,493,034 | 1/1985 | Angelle et al. | 364/200 |
| 4,530,052 | 7/1985 | King et al. | 364/200 |
| 4,571,676 | 2/1986 | Mantellina et al. | 364/200 |
| 4,590,556 | 5/1986 | Berger et al. | 364/200 |
| 4,654,787 | 3/1987 | Finnell et al. | 364/200 |
| 4,663,707 | 5/1987 | Dawson | 364/200 |
| 4,779,191 | 10/1988 | Greenblatt | 364/200 |
| 4,835,734 | 5/1989 | Kodaira et al. | 364/900 |
| 4,837,738 | 6/1989 | Lemay et al. | 364/900 |
| 4,970,642 | 11/1990 | Yamamura | 364/200 |

FOREIGN PATENT DOCUMENTS 3832912 5/1989 Fed. Rep. of Germany.

*Primary Examiner*—Michael R. Fleming
*Assistant Examiner*—Gopal C. Ray
*Attorney, Agent, or Firm*—Skjerven, Morrill, MacPherson, Franklin & Friel

[57] ABSTRACT

An addressing technique for transparently managing assignment of memory storage locations in a memory having a total capacity of T bytes for a computer operating system, the operating system having a number M of bytes of storage allocated thereto in the system memory map for storage of the operating system, involves assigning a number N of bytes of memory storage locations for storage of a core portion of the operating system, the number N being less than M, assigning a number S of blocks of additional memory storage locations in the memory, each of the S blocks of memory storage having a capacity of R bytes, where $N+R=M$; storing the portions of the operating system in addition to the core portion in the S number of blocks of the memory storage locations; retrieving one of the blocks S of the operating system from the memory storage; and retrieving the N number of bytes of the core portion of the operating system from memory storage, and utilizing the retrieved one of the blocks S with the retrieved number N of bytes of the core portion to produce the number M of bytes of the operating system.

13 Claims, 4 Drawing Sheets

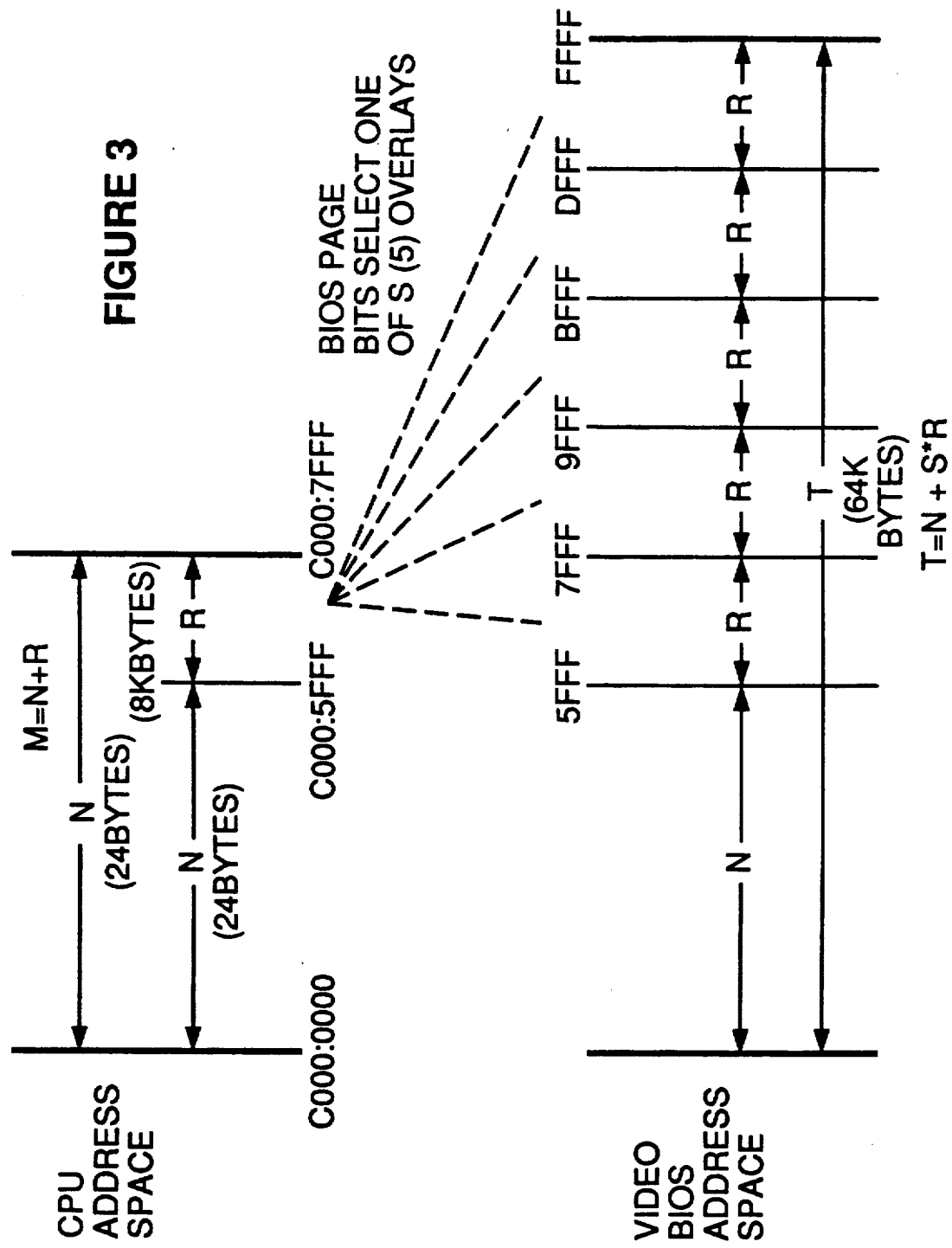

FIGURE 4

| ASSEMBLY LANGUAGE CODING OF CALL TO TARGET PROCEDURE IN OVERLAY | OBJECT MODULE AS PRODUCED BY ASSEMBLER | EXECUTABLE IMAGE AS PRODUCED BY LINKER | EXECUTABLE IMAGE AS MODIFIED BY CONVERSION UTILITY |
|---|---|---|---|
| LINE 1: NO-OP | BYTE 1: NO-OP | BYTE 1: NO-OP | BYTE 1: CALL Op Code |
| LINE 2: CALL External Target Procedure Name | BYTE 2: CALL Op Code | BYTE 2,3: INT 3F Op Code | BYTE 2,3: Memory Manager Offset |
|  | BYTE 3,4: Target Procedure Segment (Contains Overlay Numbers | BYTE 4: Overlay Number | *BYTE 4: Overlay Number |
|  | BYTE 5,6: Target Procedure Offset | BYTE 5,6: Target Procedure Offset | *BYTE 5,6: Target Procedure Offset |
| LINE 3: Next Instruction Mnemonic | BYTE 7: Next Instruction Op Code | BYTE 7: Next Instruction Op Code | BYTE 7: Next Instruction Op Code |

\* = Data Interpreted By Memory Manager Routine

METHOD FOR INCREASING EFFECTIVE ADDRESSABLE DATA PROCESSING SYSTEM MEMORY SPACE

BACKGROUND OF THE INVENTION

1. Field of the Invention

This invention relates in general to memory paging techniques, and relates more particularly to a mechanism for extending in a non-linear fashion a given amount of address space, without modifying the memory map as seen by the host central processing unit (CPU).

2. Prior Art

The present addressing technique may be applied to extending from 32KBytes to 64KBytes the existing address space reserved by the IBM PC/AT and IBM PC/XT for the Video Basic Input Output System (BIOS). This technique preserves the original CPU address map, so that existing programs can still run and will see exactly the same address space.

Preserving the CPU address space to 32KBytes is an IBM PC/AT and PC/XT compatibility requirement. The memory map of these systems is allocated among various locations and the Video BIOS must be stored within a specific, standardized address range. Departing from the 32KBytes allocated to the Video BIOS would mean a likely addressing conflict with other non-Video parts of the operating system or with applications programs which use that addressing space reserved for them by the standard IBM PC-AT and PC/XT memory map.

At the same time, Video subsystems are becoming more complex and requiring a larger BIOS to support them. If the effective address space available to the Video BIOS is not extended from 32KBytes to 64KBytes, it would become a major impediment to Video display capabilities.

SUMMARY OF THE INVENTION

The non-linear paging mechanism of the present invention allows the Video BIOS to use an effective overlay procedure, thus taking full advantage of the doubled memory space, even if the CPU still sees the same address space.

The specific requirements for the present invention are to extend the Video Graphics Array (VGA) BIOS virtual address space from 32KBytes to 64KBytes so that the CPU still uses the 32KBytes of address space mapped at C000:0000- C000:7FFF in order to access it. The CPU real address space remains 32KBytes and the virtual address extension has to be transparent to CPU accesses. This is accomplished by splitting the BIOS 64KBytes of virtual address space into a 24KByte portion of permanently accessible memory space (known as the core) and five pages of 8KBytes, each of which can be mapped into or out of the CPU address space.

In other words, the CPU will always access 32KBytes mapped at C000:0000-C000:7FFF, made up of the first 24KBytes mapped at C000:0000-C000:6000 and one of the 8KBytes pages always mapped at C000:6000-C000:7FFF. The total memory available is:

24KB + 5 times 8KB = 24KB + 40KB = 64KB, but the CPU address space is still: 24KB + 8KB = 32KB.

The main advantage of this non-linear paging mechanism is that it allows the creation of a BIOS with up to 24KBytes of core code, residing permanently in the CPU addressable space, and five 8KByte pages, containing occasionally used code which can be phased in and out of the CPU address space, under core code control. Examples of occasionally used BIOS code are: parameter tables and special BIOS calls or internal BIOS sub-routines used with special displays such as Liquid Crystal Displays (LCD).

BRIEF DESCRIPTION OF THE DRAWINGS

FIG. 3 illustrates the addressing employed in the transparent translation technique of the invention; and FIG. 4 illustrates the operation of the programming involved in implementing the present invention.

DESCRIPTION OF THE PREFERRED EMBODIMENT

Figure 1:
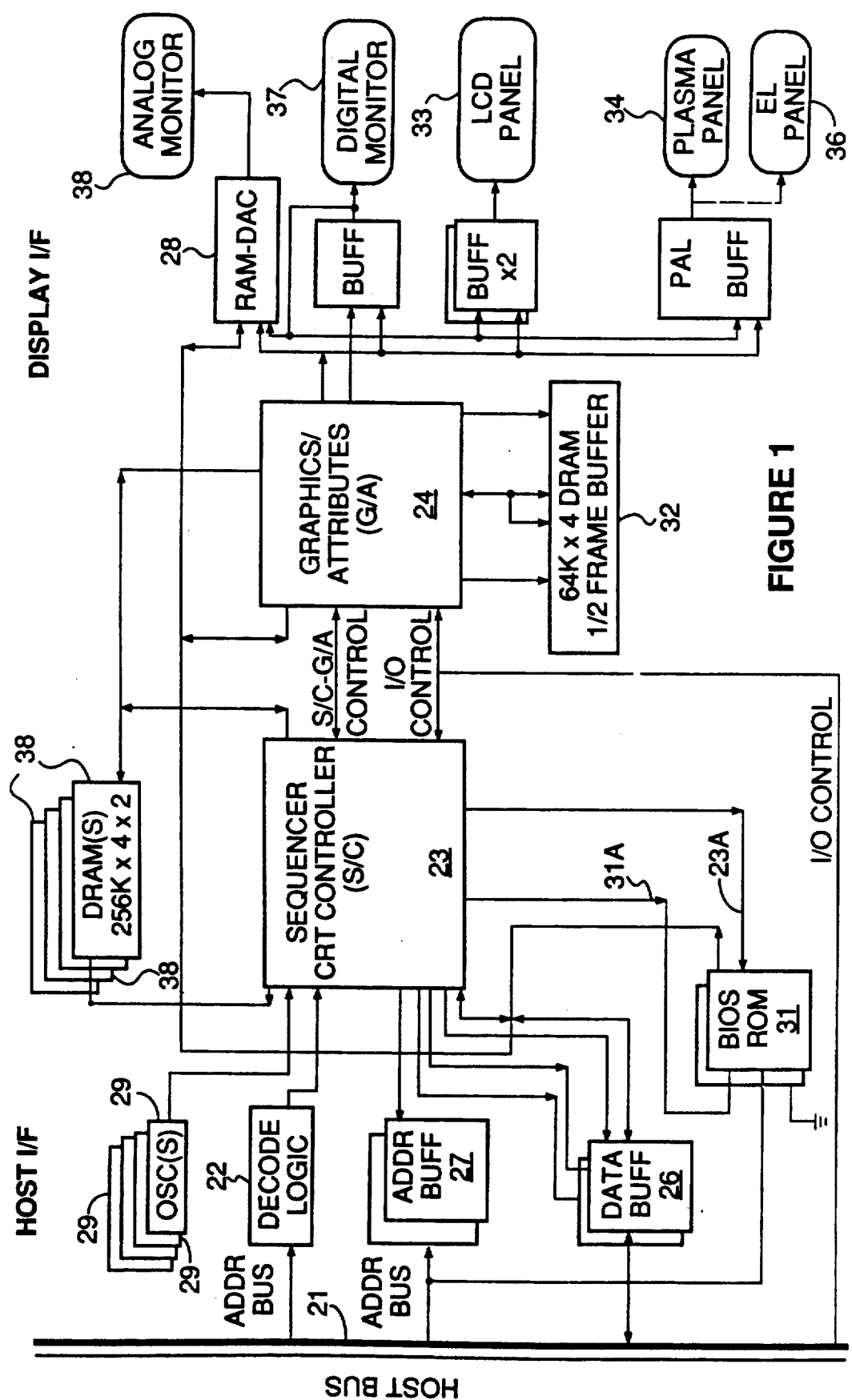
FIG. 1 is a block diagram illustrating an imaging system in which the present invention may be employed.

Referring to FIG. 1 there is shown the portion of a system for employing VGA graphics in connection with an IBM PC/AT or PC/XT or equivalent computer system. The system includes a host bus 21 which acts as an interface between the host computer (not shown) and the VGA graphics portion. Address information is supplied on an address bus to address decode logic 22 whose output is supplied as one input to a sequencer/CRT controller 23. Sequencer/controller 23 communicates with a graphics attribute controller 24 through two buses identified as S/C-G/A control and I/O control. Elements 23 and 24 may be of the type shown and described in the publication entitled "CL-GD 610/620 CRT/Flat Panel Enhanced VGA Controller" Preliminary Data Sheet, March, 1989, published by Cirrus Logic, Inc., Milpitas, Calif. This publication is incorporated herein by reference.

The system of FIG. 1 includes an 8 or 16 bit data bus which conveys data to and from host interface 21 through a data buffer 26. An additional address bus is connected to a buffer 27 which communicates with sequencer/controller 23 and a random access memory-digital-to-analog converter (RAMDAC) 28. The system also includes a plurality of oscillators 29 for providing different frequency clock signals, as is well known in the art.

A BIOS ROM 31 is employed to store the VGA BIOS information. ROM 31 receives address control signals from element 23 through a bus 23a and supplies ROM output data on a bus 31a. The ROM address information on bus 23a is utilized in accordance with the teachings of the present invention, as will be described in detail below.

The system of FIG. 1 further includes a ½ frame dynamic random access memory (DRAM) buffer 32 connected to the graphics attributes device 24 and employed in generating raster imaging information for use in imaging frames of information on raster type devices such as a liquid crystal display (LCD) 33, a plasma panel 34, an EL panel 36, a printer, or a digital or analog cathode ray tube (CRT) represented by digital and analog monitors 37 and 38, respectively. Half frame buffer memory 32 is preferably utilized in the manner taught in copending application Ser. No. 07/334,059, filed April 4, 1989, titled "Converter For Raster Image Data From Single-Segment to Multi-segment Streams" and assigned to the same assignee as the present application. The teachings of that copending application are incorporated herein by reference.

The system of FIG. 1 also includes a dynamic random access memory represented by DRAMs 39 for storing raster imaging information supplied from the host system to element 23 through the 8/16 bit data bus and for supplying the stored information to one or more of the raster imaging devices.

Figure 2:
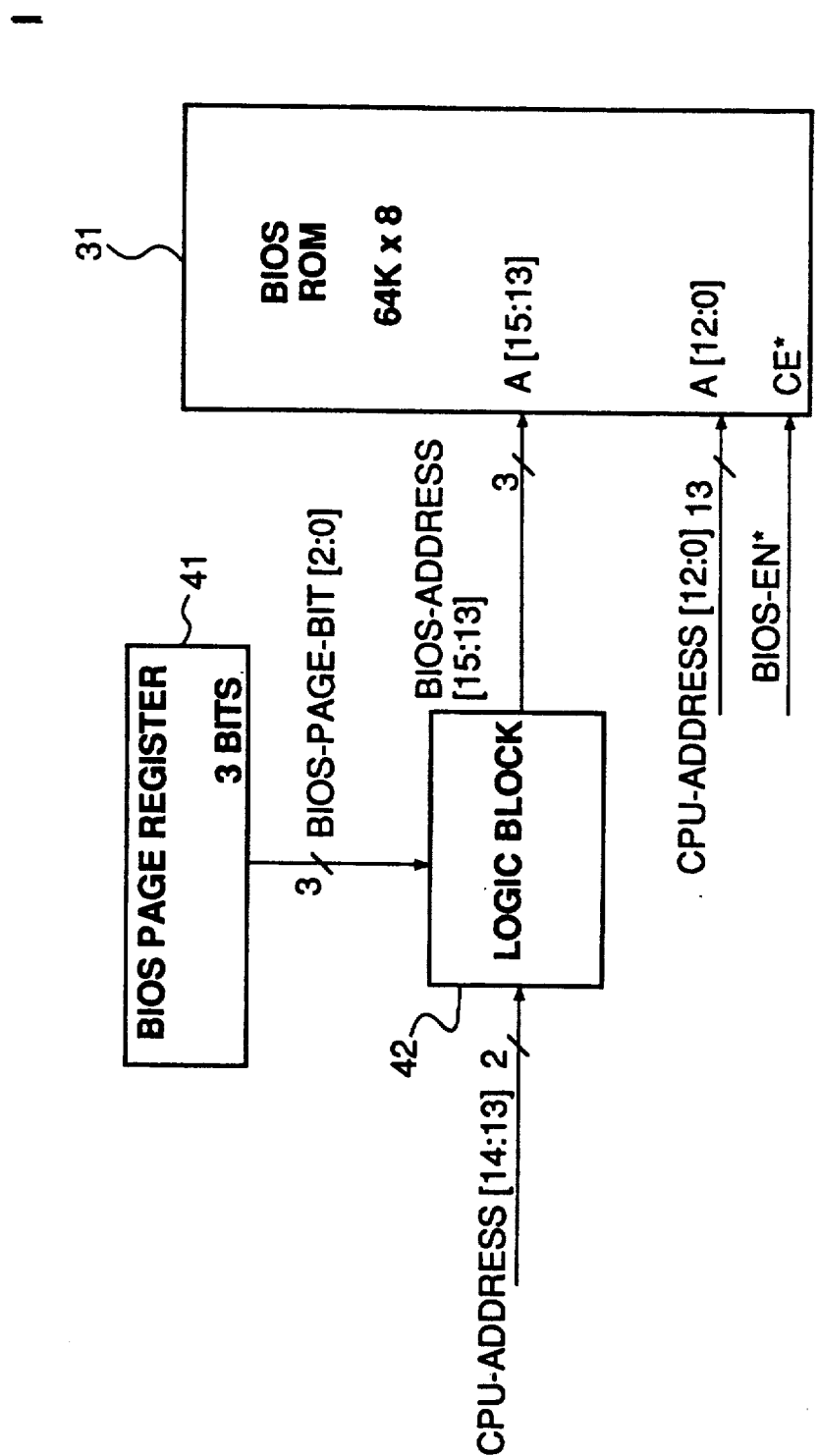
FIG. 2 is a block diagram showing the elements of the transparent memory size extension of this invention.

Referring to FIG. 2, there is shown BIOS ROM 31 from FIG. 1 containing 64K bytes of BIOS VGA information in accordance with the present invention. An indexed BIOS page register 41 is provided to supply one of three input/output port control BIOS page bits [2:0] to the input of a logic control block 42. This three-bit field is substituted for CPU address lines 13 and 14 whenever locations beyond the lower 24KBytes of the Video BIOS are accessed. The equations defining the logic functions performed by logic block 42 are set out below. To extend the virtual address space to 64KBytes, BIOS ROM 31 address lines [15:13] are controlled by the VGA Controller 23 of FIG. 1, while address lines [12:0] into ROM 31 from the host interface 21 and the address bus remain as the normal CPU address lines [12:0].

When no address extension beyond 24K bytes is required, the 32KBytes in the BIOS read only memory ROM or erasable programmable read only memory EPROM are addressed directly by the CPU-Address lines [14:0] of the PC-AT or PC/XT bus signals. For a 16-bit-wide BIOS, two 32KBytes or two interleaved 64KBytes ROM units may be used, while for an 8 bit wide BIOS, one 64KByte or two 32KByte ROM part is required.

CPU address lines [14:13] in FIG. 2 are the CPU address lines 14 and 13 on the PC/AT or PC/XT bus lines. BIOS addresses [15:13] are generated based on the CPU address lines [14:13] values and one bit of the BIOS page bits [2:0] from register 41 so that in the lower 24KBytes of ROM 31, BIOS address [15] is zero and BIOS Address [14:13]=CPU-Address [14,13], but in the upper 8KBytes of address space, in accordance with the invention, BIOS Address [15:13]=BIOS-page-bit [2:0]. The following are the logic equations for BIOS address [15:13] generation.

BIOS-page-control=CPU address [14] & CPU address [13] with this notation:

BIOS address [15]=BIOS page-bit [2] & BIOS page-control

BIOS address [14]=BIOS page-bit [1] & BIOS page-control + + CPU address [14] & BIOS page con$\overline{trol}$ BIOS address [13]=BIOS page-bit [0] & BIOS-pa$\overline{ge}$ control + + CPU-Address [13] & BIOS page con$\overline{trol}$ Where:

(&) represents a logical AND, (+) represents a logical OR, and BIOS address [15:13] are the 64KBytes BIOS EPROM or ROM address pins.

As shown in FIG. 3, equations representing the invention are, if T equals the total memory capacity in bytes for the Video BIOS (64K in the present case), M represents the number of bytes of storage allocated to the Video BIOS (32K) in the memory map, N is a number representing the number of bytes required to store a core portion of the BIOS (24K), S is the number of blocks of additional BIOS memory storage locations provided by this invention (5) and each of blocks S has R number of bytes therein (8K), then T equals N plus S times R and, M equals N plus R.

This invention allows the upper 8KBytes of the address base to be switchable among 1 of 5 different overlay segments. In extending the Video BIOS memory size, in accordance with this invention, it is a critical requirement that it be transparent to programs executing in the CPU other than the Video BIOS. The Video BIOS, on the other hand, must know about the memory extensions and must control the use of the overlay memory so that it does have access to all 64KBytes of the address space that this invention makes available to it.

There are two components of this requirement: access and control. To meet the access requirement, the BIOS executes as every other piece of software on the microprocessor executes; that is the CPU access is into the fixed 32KBytes address slot allocated by the system memory map. To meet the control requirement, the BIOS selects which one of the 5 segments is mapped into that 8K overlay space, by writing the BIOS page bits described in connection with FIG. 2. These BIOS page bits can be read and written by the CPU at a particular register address internal to the chip set. These 3 bits specify which one of the overlay pages is to be mapped into the CPU address space.

One constraint that the hardware design of this invention places on the software is that no routine in the BIOS that is located in an overlay segment can directly call another routine that is in a different overlay segment. Another constraint is that any routine in the core segment that needs to call a routine in one of the overlay segments must ensure that that overlay segment the target routine resides in the one that is mapped into the address space.

Rather than having this memory control function distributed throughout the code, the present invention includes a localized, and optimized, mechanism for management of the overlay memory in the form of a memory manager routine that is located in the core segment.

Using this memory manager-based technique, the BIOS programmer must know whether the routine being called, known as the target routine, is located in an overlay segment or in the core segment. In the former case, the call is coded as "CALL <foo>", where <foo> is the name of the target routine. In the latter case, as is also shown in the first column of FIG. 4, the call is coded as the following two-instruction sequence:

NO-OP

CALL <foo>

In addition, the routine <foo> must be declared to the assembler as being external to the current segment. As is shown in the second column of FIG. 4, this declaration causes the assembler to generate a "far" CALL code sequence, which includes information that the memory manager will need (i.e. the target procedure offset and segment/overlay number). The linker then converts this far CALL into an INTERRUPT 3F code sequence, as is shown in the third column of FIG. 4. The present invention includes a conversion utility that then is applied to covert both the single byte reserved by the NO-OP instruction and the 5 bytes used by the far CALL instruction into a 3-byte "near" CALL to the memory manager routine, as is shown in the fourth column of FIG. 4. In addition, the conversion utility places the information that the memory manager routine needs, as shown in the shaded area of FIG. 4, in these bytes as well. Thus, the executed Video-BIOS memory image contains a 3-byte call to the memory manager and 3 in-line data bytes that are not executed by the CPU but rather are interpreted by the memory manager.

The memory manager is in the core segment so it can safely write the BIOS page bits. It examines the information in the loadable memory image and obtains the segment number. It writes that to the page register and then passes control to the target routine in that memory segment.

In order to speed up the processing of these calls, the overlay manager does not receive control back from the target procedure. The overlay manager sets things up so that the target procedure does a return that passes control back to the calling procedure directly without going through the memory manager.

The means by which this is set up involves manipulating the data on the stack. When the target procedure is entered, the next information pointed to by the stack pointer, i.e. the next value on the stack, is the return address to the original calling procedure.

The process of giving control to the target procedure is done neither with a call nor with a jump; it is done with a return; the address of the target procedure is put on the the stack at SP+2 by the memory manager. The memory manager then executes a return instruction which pops the stack so control goes to the target procedure. Prior to passing control to the target routine, the memory manager has manipulated the stack contents so that SP+4 stack is the address in the calling procedure for the target procedure to return to when it is finished.

Thus, the memory manager has five tasks to perform:
1. As a preliminary, it pops registers onto the stack to preserve their values;
2. It makes the changes in the stack so that the double return technique will work;
3. It outputs to the BIOS page register to select the proper overlay;
4. It restores the values of the registers from the stack so that it is transparent to the calling and target routines
5. It executes its unconventional return instruction, thereby passing control to the target procedure.

We claim:

1. A method for transparently managing assignment of memory storage locations in a memory having a total capacity of T bytes for a computer operating system, said operating system having a number M of bytes of storage allocated thereto in the system memory map for storage of said operating system, comprising the steps of:
    allocating a number N of bytes of said memory storage locations for storage of a core portion of said operating system, said number N being less than M;
    allocating a number S of blocks of additional memory storage locations in said memory, each of said S blocks of memory storage having a capacity of R bytes, where N+R=M;
    storing the portions of said operating system in addition to said core portion in said S number of blocks of said memory storage locations;
    generating an initial memory address signal containing a plurality of bits identifying an address location in said memory storage;
    examining said memory address signal to determine whether said addressed memory storage location is within said N bytes of said memory storage locations in which said core portion of said operating system is stored;
    addressing said memory storage location identified by said memory address signals if said addressed memory location is within said N bytes;
    combining the memory address of one of said S blocks of memory storage locations with said initial memory address signal if said initial memory address location is not totally within said N bytes;
    addressing the memory storage location identified by said combined initial memory address signal and the address location defined by said one of said S blocks of memory storage locations;
    retrieving said addressed one of said S blocks of said operating system from said memory storage;
    retrieving all or a portion of said number of bytes of said core portion of said operating system from said memory storage, and
    utilizing said retrieved one of said blocks S with said retrieved number of said N bytes of said core portion to produce said number M of bytes of said operating system.

2. A method in accordance with claim 1 including the step of selecting said one of said S blocks of memory storage locations on the basis of where within said T bytes of said memory said initial memory address is located.

3. A method in accordance with claim 1 in which said number N is a whole multiple of said number R.

4. A method in accordance with claim 1 in which the sum of N plus S times R equals T.

5. A method in accordance with claim 2 including the steps of:
    generating said initial memory address utilizing a plurality P of address signal lines;
    utilizing the signals on said plurality P of address signal lines to address said memory storage of said addressed memory location if said addressed memory location is within said N bytes;
    generating a plurality of page bits to select one of said S blocks of additional memory storage locations;
    combining a selected one of said page bits with a number P-K of the signals on said address signal lines to generate an address defining a memory address location which is larger than the address of said N bytes, where K is a whole integer; and
    addressing said address location which is larger than the address of said N bytes utilizing said address defined by said selected page bit and the signals on said P-K lines.

6. A method in accordance with claim 5 in which P equals 16.

7. A method in accordance with claim 6 in which K equals 1 and said number of page bits is 3.

8. A method in accordance with claim 5 for managing and controlling which of said S segments are mapped into said computer's address space so as to be addressed by the computer at the upper R bytes of said M bytes allocated to said operating system, including the step of altering said page bits by a memory manager routine located in said core portion.

9. A method in accordance with claim 8 for calling said memory manager routine in which information required by said memory manager to transfer control to a target routine is provided to said memory manager routine in-line with instructions executed by the computer.

10. A system for transparently managing assignment of memory storage locations in a memory having a total capacity of T bytes for a computer operating system, said operating system having a number M of bytes of storage allocated thereto in the system memory map for storage of said operating system, said system comprising:

means for assigning a number N of bytes of said memory storage locations for storage of a core portion of said operating system, said number N being less than M;

means for assigning a number S of blocks of additional memory storage locations in said memory, each of said S blocks of memory storage having a capacity of R bytes, where N+R=M;

means for storing the portions of said operating system in addition to said core portion in said S number of blocks of said memory storage locations;

means for generating an initial memory address signal containing a plurality of bits identifying an address location in said memory storage;

means for examining said memory address signal to determine whether said addressed memory storage location is within said N bytes of said memory storage locations in which said core portion of said operating system is stored;

means for addressing said memory storage location identified by said memory address signals if said addressed memory location is within said N bytes;

means for adding the memory address of one of said S blocks of memory storage locations to said initial memory address signal if said initial memory address location is not totally within said N bytes;

means for addressing the memory storage location identified by said combined initial memory address signal and the address location defined by said one of said S blocks of memory storage locations;

means for retrieving said addressed block S of said operating system from said memory storage;

means for retrieving all or a portion of said N number of bytes of said core portion of said operating system from said memory storage, and means for utilizing said retrieved one of said blocks S with said retrieved number of said N bytes of said core portion to produce said number M of bytes of said operating system.

11. A system in accordance with claim 10 including means for selecting said one of said S blocks of memory storage locations on the basis of where within said T bytes of said memory said initial memory address is located.

12. A system in accordance with claim 10 in which said number N is an even multiple of said number R.

13. A system in accordance with claim 10 in which the sum of N plus S times R equals T.

* * * * *